United States Patent
Farr et al.

(10) Patent No.: US 10,229,220 B2
(45) Date of Patent: Mar. 12, 2019

(54) AUTOMATIC ENTRY OF SUGGESTED TRANSLATED TERMS IN AN ONLINE APPLICATION PROGRAM

(71) Applicant: Coupa Software Incorporated, San Mateo, CA (US)

(72) Inventors: Brian Farr, Mountain View, CA (US); Carl Rydbeck, San Mateo, CA (US); Brent Wooden, Pacifica, CA (US); Toru Mori, Santa Rosa, CA (US)

(73) Assignee: Coupa Software Incorporated, San Mateo, CA (US)

( * ) Notice: Subject to any disclaimer, the term of this patent is extended or adjusted under 35 U.S.C. 154(b) by 307 days.

(21) Appl. No.: 15/150,197

(22) Filed: May 9, 2016

(65) Prior Publication Data

US 2017/0322944 A1 Nov. 9, 2017

(51) Int. Cl.
    G06F 17/20 (2006.01)
    G06F 17/30 (2006.01)
    H04L 29/08 (2006.01)
    G06F 17/28 (2006.01)

(52) U.S. Cl.
    CPC ........ *G06F 17/3089* (2013.01); *G06F 17/289* (2013.01); *G06F 17/2854* (2013.01); *H04L 67/02* (2013.01); *H04L 67/2823* (2013.01); *H04L 67/303* (2013.01)

(58) Field of Classification Search
    CPC .... G06F 9/454; G06F 9/4448; G06F 17/2836; G06F 11/3604; G06F 17/289; G06F 17/3089
    USPC .......................................................... 704/2–8
    See application file for complete search history.

(56) References Cited

U.S. PATENT DOCUMENTS

| | | | |
|---|---|---|---|
| 6,092,036 A * | 7/2000 | Hamann | G06F 9/454 704/8 |
| 7,103,875 B1 * | 9/2006 | Kaneko | G06F 9/454 717/125 |
| 7,207,005 B2 | 4/2007 | Lakritz | |
| 7,571,092 B1 * | 8/2009 | Nieh | G06F 9/454 704/2 |
| 7,823,062 B2 | 10/2010 | Liberty | |
| 8,489,980 B2 | 7/2013 | Lakritz | |
| 8,825,692 B1 * | 9/2014 | Telnov | G06F 17/2229 707/760 |

(Continued)

OTHER PUBLICATIONS

In-App Translator. Knowledge Base [online]. Translation Exchange, Inc., retrieved on May 16, 2016, http://docs.translationexchange.com/in-app-translator/, 9 pages.

(Continued)

*Primary Examiner* — Olujimi Adesanya
(74) *Attorney, Agent, or Firm* — Hickman Palermo Becker Bingham LLP

(57) ABSTRACT

A method and system for a translation manager system are described. The translation manager system allows a web translation application to insert the proper translations into web pages generated by the translation manager system. The translation manager system properly identifies how a page is reached by the user, as well as where in the page the user has selected to make their suggestion. The translation manager system uses key-locations to identify different areas where the user may make a suggestion and the web page may include multiple key-locations.

18 Claims, 11 Drawing Sheets

(56) References Cited

U.S. PATENT DOCUMENTS

| | | | |
|---|---|---|---|
| 9,201,865 B2 | 12/2015 | Tran | |
| 9,910,850 B2 | 3/2018 | Sakashita | |
| 9,971,767 B1* | 5/2018 | Chang | G06F 3/0481 |
| 2003/0115552 A1* | 6/2003 | Jahnke | G06F 9/454 |
| | | | 715/201 |
| 2005/0240905 A1* | 10/2005 | Pournasseh | G06F 9/454 |
| | | | 717/136 |
| 2006/0004738 A1* | 1/2006 | Blackwell | G06F 9/454 |
| 2006/0294463 A1* | 12/2006 | Chu | G06F 9/454 |
| | | | 715/703 |
| 2007/0050757 A1* | 3/2007 | van Woerkom | G06F 9/454 |
| | | | 717/117 |
| 2007/0225966 A1* | 9/2007 | Suen | G06F 9/454 |
| | | | 704/9 |
| 2008/0066057 A1* | 3/2008 | Aoyama | G06F 11/3684 |
| | | | 717/124 |
| 2008/0195377 A1* | 8/2008 | Kato | G06F 17/2836 |
| | | | 704/8 |
| 2009/0164494 A1* | 6/2009 | Dodin | G06F 8/42 |
| 2010/0100369 A1* | 4/2010 | Shetty | G06F 17/2735 |
| | | | 704/4 |
| 2010/0211377 A1* | 8/2010 | Aoyama | G06F 9/454 |
| | | | 704/8 |
| 2011/0144972 A1* | 6/2011 | Koenig | G06F 17/2725 |
| | | | 704/2 |
| 2011/0179073 A1* | 7/2011 | Nilsson | G06F 9/454 |
| | | | 707/769 |
| 2012/0109625 A1* | 5/2012 | Luo | G06F 17/2247 |
| | | | 704/2 |
| 2012/0109631 A1* | 5/2012 | Gopal | G06F 17/289 |
| | | | 704/3 |
| 2013/0086224 A1* | 4/2013 | Teraguchi | G06F 17/30312 |
| | | | 709/219 |
| 2014/0033097 A1* | 1/2014 | Chiang | G06F 3/0481 |
| | | | 715/765 |
| 2015/0039287 A1* | 2/2015 | Han | G06F 9/454 |
| | | | 704/2 |
| 2015/0186132 A1* | 7/2015 | Oliveri | G06F 8/34 |
| | | | 717/120 |
| 2018/0232365 A1* | 8/2018 | Chang | G06F 17/2818 |
| 2018/0232366 A1* | 8/2018 | Chang | G06F 3/0481 |

OTHER PUBLICATIONS

Mcintyre, U.S. Appl. No. 15/660,836, filed Jul. 26, 2017, Office Action dated Dec. 19, 2018.

* cited by examiner

AUTOMATIC ENTRY OF SUGGESTED TRANSLATED TERMS IN AN ONLINE APPLICATION PROGRAM

TECHNICAL FIELD

The present disclosure generally relates to systems and techniques for providing customized web pages generated by application servers and, more specifically, to improving translations used for web pages generated by application servers. SUGGESTED GROUP ART UNIT: 2626; SUGGESTED CLASSIFICATION: 704/2.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

People collaborate across the world using the Internet. Especially for a large organization, it is common to include people from different backgrounds and working in different locations to bring their respective skills together. This inclusiveness has resulted in challenges that previously did not exist.

For example, a web application is accessible to users in organizations in a web browser environment. This provides the convenience of having software that is easily accessible where there is an internet connection, throughout the world. However, there are challenges when working in this environment. One common barrier is language. For example, although most users may understand a single language such as English, they are more familiar and comfortable working in another language.

Although humans and machine-assisted translation products are available to provide text in different languages, they do not completely solve the problem. Sometimes translators get it wrong. Especially for industry specific terms, it is difficult to get the proper translations that suit the specific industry. This is especially difficult when certain terms do not exist in the vocabulary of a language. For example, consider the term "sourcing." Taken literally, sourcing may translate into "originating" or other improper translation.

Another example when translators may not work is when users or organizations have internal jargon that they prefer to more industry standard terms. For example, although the term for a person or group that handles the hiring, positioning, and overseeing of employees in an organization is commonly known in English as a "Human Resources" department, a particular organization may refer to their department as the "Human Capital Management" department or use some other term. Human Resources may be semantically accurate, but may not reflect the personalized needs of the user of organization.

Further, if a user wants to make a change, it is very inefficient. When the user sees a web page with a text element that they believe needs changing, the user will make a screen capture of the web page, note a term where the suggestion should be made, and send it to an administrator of the web application to make the suggested changes by changing one or more code elements. However, this is very cumbersome and difficult. When the administrator receives the suggestions, they are unable to see how the web page was generated. This is not as easy as finding, copying, and pasting the suggestion, since suggestions matter in their specific context. For example, the administrator cannot make the changes to all instances of web pages generated by the web application directly, since they need to find where the suggestion applies. Even though two web pages generated by the web translation application may have the same term on multiple web pages, it may not be appropriate to change it on both web pages. Some common words may have different meaning according to its use-context.

DETAILED DESCRIPTION

Figure 1:
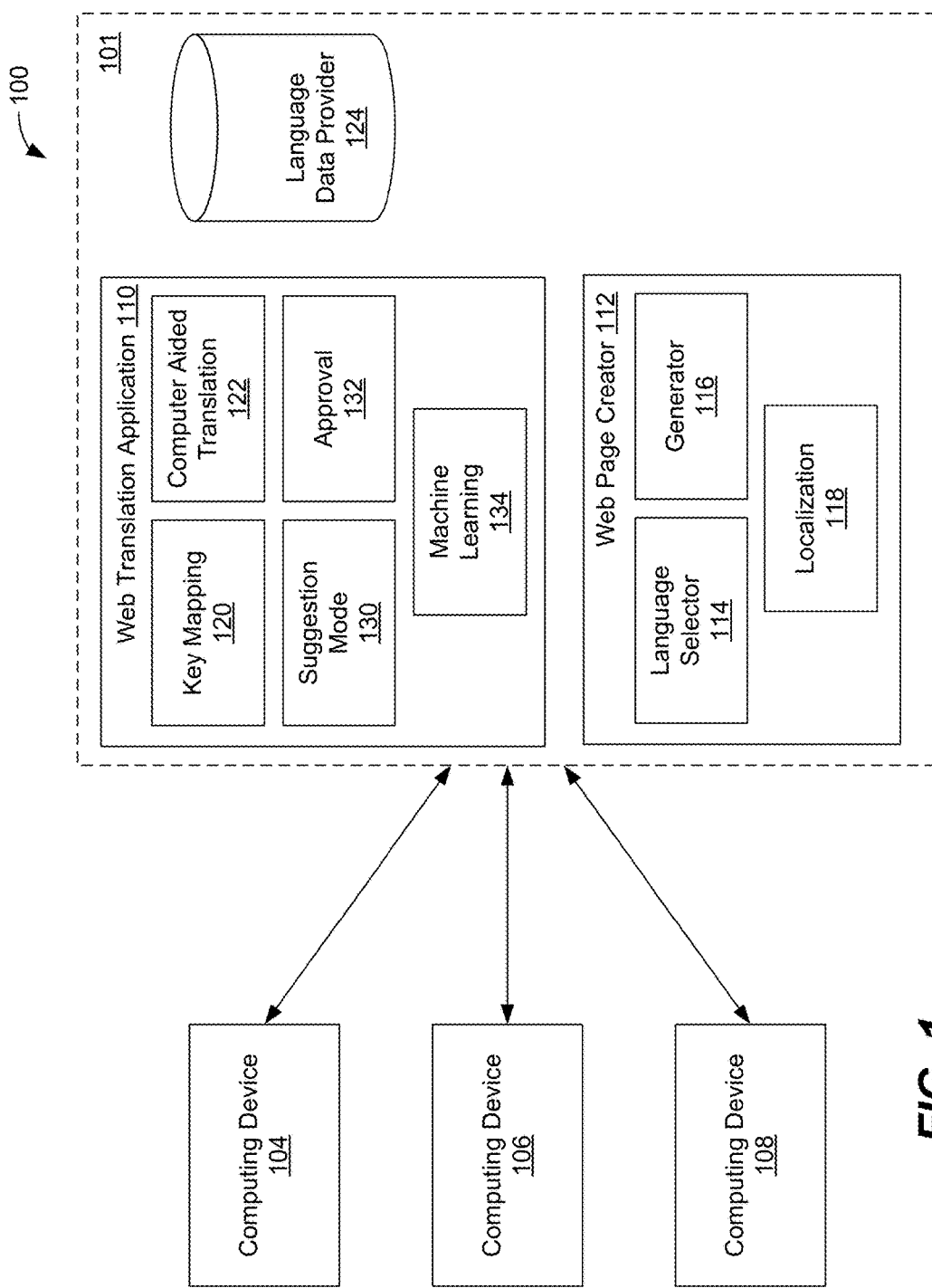
FIG. 1 is a block diagram of computer systems involved in a translation manager system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Certain embodiments are described in the context of working with a web translation application executing on a web server. However, it is understood that a web server is only a specific type of application of which there are others. For example, the same principles as discussed in this application would be applicable to applications that execute on a standalone computer, without network access.

Embodiments are described in sections below according to the following outline:
1. GENERAL OVERVIEW
2. EXAMPLE COMPUTER SYSTEM CONTEXT
   2.1 TRANSLATION MANAGER SYSTEM
   2.2 HUMAN-READABLE NATURAL LANGUAGES 3. METHOD OF MAKING AND VIEWING TRANSLATIONS
   3.1 IDENTIFYING AND MAPPING KEY-LOCATIONS OF A WEB PAGE
   3.2 REGISTRATION AND TYPES OF USERS
4. EXAMPLE SCREEN CAPTURES OF A TRANSLATION MANAGER SYSTEM
   4.1 ACTION WITHOUT RESTARTING APPLICATION SERVER
   4.2 VALIDATION OF SUGGESTIONS
   4.3 MACHINE LEARNING FOR SUGGESTIONS
   4.4 SUGGESTION PRESENTATION
5. IMPLEMENTATION EXAMPLE—HARDWARE OVERVIEW 1. General Overview Systems and methods are provided that allow a computing device, which is located in a position that is remote with respect to a server that is executing code for a web translation application, to specify translations of terms in a web page that is generated by the web translation application. In an embodiment, a translation manager system is programmed to receive suggested new translations from the computing device and to install or incorporate the new translations into web pages that are generated by a web translation application. The translation manager system identifies how a particular web page is reached by the computing device, as well as what term within the page the computing device has selected to make a suggestion of a translation. In an embodiment, the translation manager system uses key-locations to identify different terms or text for which the computing device may provide input as a suggestion. The key-locations are presented to the computing device with context provided by including, with a suggestion, a version of the page with visual indications where changes may be made. When a suggestion is made by the computing device, the translation manager system records where the suggestion was made, what the suggestion is, and other related information. Accepted suggestions may begin appearing on updated pages that are delivered later to other computing devices.

In an embodiment, a computer implemented method includes executing, at a server computer, digital program instructions of a web translation application. The web application may be accessible by other client computers over a network. The computer implemented method includes generating a web page of the web translation application by the digital program instructions including identifying one or more key-locations in the web page of text in a first human-readable language that is capable of translation to a second human readable-language. The computer implemented method further includes loading, in electronic digital memory of the server computer that is associated with a first instance of the web translation application that is associated with a first client computer, a digital translation table that maps the one or more key-locations to corresponding text elements in the second human readable-language. The computer implemented method may select from the digital translation table a particular text element to include in the web page at each of the one or more key-locations. The computer implemented method then transmits the web page from the server computer to the first client computer. The computer implemented method includes receiving, at the server computer, a first input from the first client computer specifying to invoke a suggestion mode. The computer implemented method further includes receiving a second input from the first client computer specifying an updated text element in the second human readable-language to replace an existing one of the corresponding text elements that is then currently associated with a first key-location stored in the digital translation table. The computer implemented method includes updating an entry of the digital translation table for the first key-location to include the updated text element to create an updated digital translation table in the memory of the server computer. The computer implemented method includes generating the web page for a second client computer including selecting, from the updated digital translation table, the updated text element for the first key-location in the web page, and transmitting the web page from the server computer to the second client computer.

2. Example Computer System Context 2.1 Translation Manager System

FIG. 1 is a block diagram of computer systems in a translation manager system, according to an embodiment. In the example of FIG. 1, a translation manager system 100 includes an application server computer 101 that is accessible over a network by multiple computing devices, such as computing device 104, computing device 106, and computing device 108. Although there are three computing devices shown in FIG. 1, any other number of computing devices may be registered with the application server at any given time. For example, computing devices may be registered with the application server non-contemporaneously, so that although the computing device has logged onto a registered account with the application server previously, it does not have to be logged on with another computing device at the same time. Thus, the elements in FIG. 1 are intended to represent one workable embodiment but are not intended to constrain or limit the number of elements that could be used in other embodiments.

In an embodiment, the application server computer 101 provides an environment to execute a web translation application 110. A web browser installed on a computing device may be used to access the web translation application 110, request and receive dynamically generated web pages as part of the functions of the web translation application 110, and provide input. In some embodiments, the application server computer executes a single instance of the web translation application 110 that different user groups may access concurrently or successively, and the web translation application 110 enforces segmentation of data to ensure that the data for one enterprise is inaccessible to users of other enterprises. In other embodiments, the application server computer executes multiple different instances of the web translation application 110, and different user groups have exclusive access to different instances of the web translation application 110 along with its associated user group data. Further, in some embodiments, the web translation application 110 is fully integrated with other application program code that provides substantive business functions or other functions, such as a procurement system, purchasing or invoice management system; this arrangement is shown in FIG. 1. In other embodiments, the functions described herein for web translation application 110 may be implemented as a system that is separate from, but supplements, an otherwise independent web application that supports business features or other features. In other words, the translation suggestion functions described herein do not need to be fully integrated in or tightly coupled with a separate business application but could be accessible via an application programming interface (API), remote procedure calls (RPC), or other interoperation mechanisms.

In an embodiment, the web translation application 110 may be implemented as a three tier system comprising presentation, application, and storage tiers or layers. The presentation tier dynamically generates and provides web pages to a web browser executing on a computing device, which is responsible for presenting information to a user. The application tier may execute on the application server and is programmed for determining, generating, and selecting content to be handled by the presentation tier. The storage tier may be implemented using a database interface on the application server and one or more databases that are accessible by the application server, which is responsible for the collection maintenance, and storage of data used by the web translation application 110, and located on network attached storage, cloud storage, or other storage facilities. In an embodiment, when a request is received by the presentation tier, it is forwarded to the application tier which processes the request to determine how to respond to the request according to business logic for the application. If data is needed to respond, the application tier may invoke the database tier which accesses and updates one or more databases. A result to the request is generated by the application tier and transmitted to the presentation tier for display using a web page. Other embodiments of the web translation application 110 may include more layers as needed for the particular web translation application 110.

In an embodiment, translation manager system 100 includes the translation module 110 and a web page creator module 112. These modules are programmed to perform functions that may access the web translation application 110 executing on the application server using a defined programmatic mechanism, such as through an Application Programming Interface (API).

In an embodiment, the translation manager system 100 includes features that may be integrated into a web translation application 110 through an API. The API may include interfaces that accept calls to libraries, drivers, documentations, or tools of the translation manager system 100. Each API may provide functions such as suggestion and administrator review methods. Programmers may implement all or part of the functions provided by the API. As an example, a programmer may use the suggestion features of the translation manager system 100, but not to implement the administrator review features in a web translation application 110.

The API of the translation manager system 100 may be programmed using any suitable program development environment; in one embodiment, the development environment is RUBY ON RAILS. Other embodiments of the translation manager system 100 may be adapted to be used with ANGULAR, APACHE STRUTS, BACKBONE.JS, EMBER, GOOGLE INC.'S ANDROID, JAVA ENTERPRISE, JAVASCRIPT, NODE.JS, OBJECTIVE C & IOS, PHP, PIVOTAL SPRING, PYTHON DJANGO, REACT, SINATRA, WINDOWS PHONE, or other similar platforms.

In an embodiment, translation manager system 100 includes, as part of the web page creator 112, a language selector module 114, a generator module 116, and a localization module 118. The language selector module 114 is programmed for determining a human-readable natural language that web pages transmitted by the application server to a computing device should be in. The language may be a default language specified by the computing device or an explicit selection by a user at the computing device for a particular language. In other embodiments, the translation manager system 100 may be adapted to select images or videos. For example, for a given language selected by a user, different images or videos may be provided in response.

The generator module 116 is programmed for generating web pages. A web page generated by the generator module 116 may include one or more key-locations or keys, which specify different locations on the web page and an identifier designating what the proper text should be at the respective key-location. Not all text elements on a web page may be indexed by a key-location. For example, some text elements may be hard-coded into the web page and not subject to translation suggestions. Other times, some text elements may be data or other fields that are not subject to translation, such as numerical data, dates, or other such data.

The localization module 118 is programmed for determining, at each key-location for a web page, what element should be inserted. For example, in conjunction with the language selector module 114, the localization module 118 is programmed to select one of the languages stored as tables at a language data provider 124. The language data provider 124 may be any provider that supplies language information to the translation manager system 100. Although the language data provider 124 is shown in FIG. 1 as being included with the application server computer 101, in other embodiments one or more databases may be managed on computing devices different than the application server computer 101.

In an embodiment, the language database provider is implemented on a database. The database may comprise one or more computing devices, which store natural language information for the translation manager system 100. The language information may be represented in a table data structure, where each table holds information on one or more natural languages. Each table may be stored on one or more computing devices.

2.2 Human-Readable Natural Languages

In an embodiment, the translation manager system 100 is programmed to interoperate with different human-readable natural languages. Each language table of the language data provider 124 stores human-readable text elements for a specific language. Example languages include Arabic, Catalan, Chinese, Danish, Dutch, Estonian, French, German, Italian, Japanese, Polish, Portuguese, Russian, Spanish, Swedish, Ukrainian, and Urdu.

In an embodiment, a human-readable language may include terms, phrases, or clauses that are specific to a customer, company, or user of the web translation application 110. For example, a particular company acting as an enterprise user of an instance of the web translation application 110 may have a specific set of terms that the company uses internally that may not conform to other translations in the same language or a different language that other companies or users prefer to use with their instances of the web translation application 110. In an embodiment, translation manager system 100 is programmed to select these customer, company, or user specific translations as human-readable text when generating pages for the specific customer, company, or user. For example, a company may choose to use 'warehouse' instead of 'distribution center' or 'supplier' instead of 'vendor.'

In an embodiment, in translation manager system 100 the translation module 110 comprises a key mapping module 120, a computer aided translation module 122, a suggestion mode module 130, an approval module 132, and a machine learning module 134. The key mapping module 120 is programmed for identifying, for each key-location identified by the generator module 116, a respective text element. Using a language specified by the language selector module 114, the key mapping module 120 may select text elements provided by the computer aided translation module 122 or any of language tables of the language data provider 124.

In an embodiment, if a computing device 104, 106, 108 has input for a suggestion of a translation for a particular text element, in response, the suggestion mode module 130 is programmed to provide a version of a web page in the suggestion mode, with which the computing device 104, 106, 108 can select and enter suggestions for a text element at a particular key-location. The approval module 132 is programmed for storing, presenting to an administrator of the web translation application 110, and updating a language table of language data provider 124. For example, if a computing device 104, 106, 108 has provided a suggestion at a key-location, the approval module 132 stores this suggestion, presents the suggestion to an administrator, and if the suggestion is accepted, makes updates to the proper language table.

In an embodiment, machine learning module 134 is programmed with algorithms to learn when and what changes should be made by the translation manager system 100, including applying a suggestion at more than one key-location, when the suggestion is accepted by an administrator.

Each of the modules identified above may be implemented, in various embodiments, using one or more computer programs, other software elements, which are stored on computer-readable media and loaded and executed from that media, or using a combination of software, firmware and hardware. Each of the modules, in one embodiment, comprises a set of computer program instructions forming part of one or more executables. In an embodiment, the programs and instructions may be implemented using a software development environment such as RUBY ON RAILS and/or programming languages such as C, C++, JAVA, OBJECTIVE-C, and the like.

3. Method of Making and Viewing Translations

Figure 2:
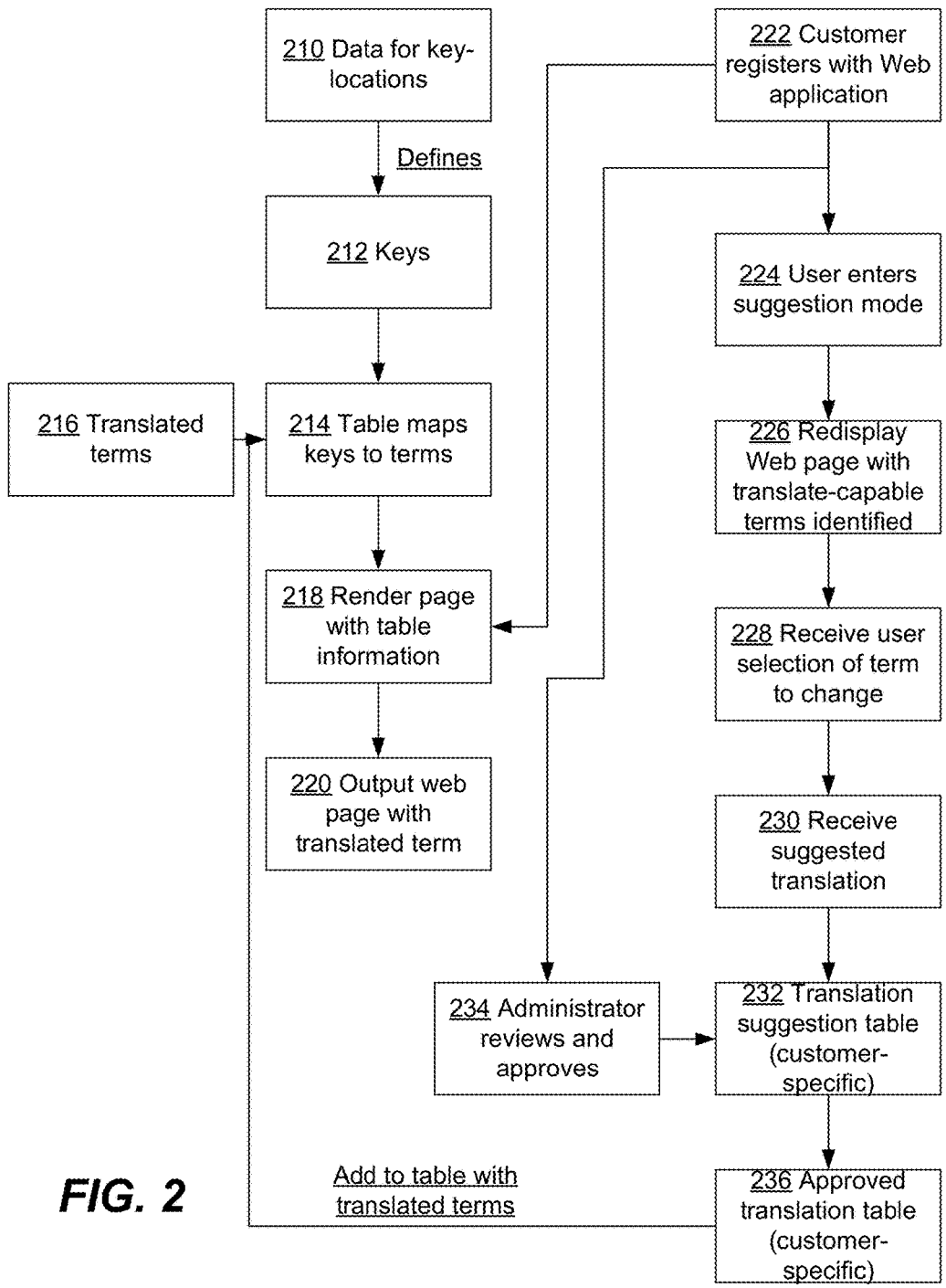
FIG. 2 is a flowchart of a method of making and viewing translations for a web translation application, according to an embodiment.

FIG. 2 is a flowchart of a method of making and viewing translations for a web translation application, according to an embodiment. For purposes of illustrating a clear example, FIG. 1 is described herein in the context of FIG. 1, but the broad principles of FIG. 2 can be applied to other systems having configurations other than as shown in FIG. 1. Further, FIG. 2 and each other flow diagram in this disclosure, illustrates an algorithm or plan that may be used as a basis for programming one or more of the functional modules of FIG. 1 that relate to the functions that are illustrated in the diagram, using a programming development environment or programming language that is deemed suitable for the task. Thus, FIG. 2 and each other flow diagram in the disclosure is intended as an illustration at the functional level at which skilled persons, in the art to which this disclosure pertains, communicate with one another to describe and implement algorithms using programming. The flow diagrams are not intended to illustrate every instruction, method object or sub step that would be needed to program every aspect of a working program, but are provided at the high, functional level of illustration that is normally used at the high level of skill in this art to communicate the basis of developing working programs.

3.1 Identifying and Mapping Key-Locations of a Web Page

In step 210, data defining key-locations or keys of terms that could be translated is created and stored. In one embodiment, a digital translation table, which maps names of keys to values of translated terms for those keys, is created and stored. In another embodiment, the translation manager system 100 scans webpage code to identify instances of output functions that have been tagged as using keys, key-locations or terms that are capable of translation.

In step 212, the translation manager system 100 identifies key-locations for a web page that will be generated by the web page creator 112 of the translation manager system 100. For example, the translation manager system 100 retrieves keys for key-locations included with the web page from the digital translation table that was created at step 210. Some of these key-locations may be indexed or mapped to a text element.

In step 214, the translation manager system 100 uses the digital translation table to map keys to specific terms or text elements. For example, for every key-location identified on the web page, the translation manager system 100 performs a lookup to determine what text element should appear at the key-location. There may be one or more text elements that may appear at a given key-location and the translation manager system 100 chooses which of the text elements is the appropriate text element based on a user's explicit preference, a default preference provided by the translation manager system 100, an organization preference, or any other method.

In step 216, the translation manager system 100 receives the translated terms for each key-location. For example, the translation manager system 100 maps key-locations to their respective values found in the translation table.

In step 218, the translation manager system 100 generates the web page. During generation, translated terms from the digital translation table are automatically retrieved for each text element in the web page and substituted at each key-location so that the rendered web page output contains the translated terms.

In step 220, the translation manager system 100 outputs the web page with translated terms. This may be on a mobile device, personal computer, tablet computer, or any other suitable computing device.

3.2 Registration and Types of Users

In step 222, the translation manager system 100 receives a request from one of the computing devices 104, 106, 108 to suggest translated terms for the web translation application 110. In some embodiments, the translation manager system 100 enrolls different types of users that have different functional privileges in the system, and only certain users or user roles are permitted to suggest or approve of translations of terms. The request of step 222 may comprise input from one of the computing devices 104, 106, 108 indicating selection of a suggestion mode widget in a web page that the computing device has displayed in a browser as a result of normal interaction with the web translation application 110.

In an embodiment, when the user of one of the computing devices 104, 106, 108 is a customer type user, in step 224 the translation manager system 100 enters a suggestion mode for the particular web page at which the request was received. Entering the translation mode for every web page from the web translation application 110 is not required. For example, if each text element at the key-locations for a web page is acceptable, then a computing device does not need to provide input to enter the suggestion mode and can proceed to other pages generated by the translation manager system 100.

In step 226, the translation manager system 100 causes redisplaying the web page with all of the translate-capable terms identified in the page. In various embodiments, different types of identification methods may be used, such as highlighting text, underlining, changing font color, including an arrow or other shape next to the translation-capable terms, or other identification methods. The result is that one of the computing devices 104, 106, 108 displays, via the browser or other application, the web page at which translation mode was requested, in which all terms capable of receiving translation suggestions have been highlighted.

In step 228, the translation manager system 100 receives a selection of a term for a suggestion from the computing device 104, 106, 108. For example, in one embodiment the translation manager system 100 receives input via the browser indicating that the computing device 104, 106, or 108 clicked on a particular term in a particular location of a document object model (DOM) tree of the web page or a particular screen location.

In step 230, the translation manager system 100 receives a suggested translation for the selected term to change. For example, in one embodiment the translation manager system 100 receives input via the browser indicating that the computing device 104, 106, or 108 typed a translation of a particular term, or selected a translated term from a graphical user interface widget such as a pull-down menu. The input represents a suggestion of a translated term corresponding to the key or key-location of the particular location that was selected at step 228.

In step 232, the translation manager system 100 adds the translation suggestion to a validation queue. The validation queue is programmed for storing suggested translations provided by computing devices to the translation manager system 100 while the suggestions await review and approval by an administrator as described next. In one embodiment, the validation queue is omitted and translation suggestions result in immediate updates to the digital translation table.

In an embodiment, when the user is an administrator type user, in step 234, the administrator reviews and approves suggestions using a graphical user interface and set of programmed functions of the translation manager system 100 that are available to the user only based upon the user's role as an administrator. In an embodiment, translation manager system 100 retrieves pending suggestions that are stored in the validation queue, displays the queue or the suggestions, and provides options for the administrator type user to approve or deny suggestions. With appropriate programming of translation manager system 100, the administrator type user may be offered various options when viewing suggestions from customer type users. For example, the administrator type user may sort suggested translations by location, translation key, current translation, which customer type user created the suggestion, a source path indicating a hierarchical location of the web page among all pages that the web translation application 110 generates, or any combination of these to assist them in reviewing suggestions stored in the validation queue.

In step 236, after the administrator has approved a suggestion, it is added to the digital translation table. For example, in response to input from one of the computing devices 104, 106, 108 indicating that a particular translation suggestion is approved, the translation manager system 100 updates the digital translation table and removes the approved suggestions from the validation queue, based on the administrator type user's decision In an embodiment, the translation table is customer-specific or location-specific or instance-specific, and the system 100 may maintain a plurality of different translation tables each associated with a different computing device 104, 106, 108, or group of computing devices, accounts, users or enterprise. With this approach, when a computing device 104, 106, 108 provides a suggested translation for a particular key that is approved, then only the translation table associated with that computing device, account, user or enterprise is updated, and all other translation tables of other enterprises or groups are unaffected. Therefore, the suggested translation will not be seen by computing devices 104, 106, 108 or other users that are not of the same organization as the user whom provides a suggestion. In some embodiments, different offices, locations or facilities of a particular single enterprise each may access one or more different instances of the web translation application 110 that use the translation manager system 100 to update different translation tables that are specific to those offices, locations or facilities. With this approach, one enterprise hypothetically named Acme Corporation may have a first office in Paris, France that uses one set of translation suggestions that are reflected in a first translation table; a second office of the same enterprise and located in Munich, Germany may use a second, different set of translation suggestions, in the same natural language or a different natural language, that are reflected only in a second translation table. Different translation tables for the same enterprise also may use the same natural language but reflect different localized preferences for translated terms based upon dialect, regional differences in culture or customs, and other factors.

4. Example Implementation of a Translation Manager System Using a Graphical User Interface FIG. 3, FIG. 4, FIG. 5, FIG. 6, FIG. 7, FIG. 8, FIG. 9, FIG. 10 are diagrams of graphical user interface screen displays that show different screen captures of example functional output of the web translation application 110, in an embodiment. The web translation application 110 is programmed to generate and cause displaying output of the type shown in FIG. 3, FIG. 4, FIG. 5, FIG. 6, FIG. 7, FIG. 8, FIG. 9, FIG. 10 by executing programs that implement the algorithms that are described in other sections herein. FIG. 3, FIG. 4, FIG. 5, FIG. 6, FIG. 8, FIG. 9, FIG. 10 show different screen captures of example output of the web translation application 110 during interoperation with the translation manager system 100 for a customer type user. FIG. 3, FIG. 4, FIG. 5, FIG. 6 are diagrams of graphical user interface screen displays that show different screen captures of output for a customer type user that logs on and uses the web translation application 110 with interaction or interoperation with the translation manager system 100, in an embodiment. FIG. 7 shows a screen capture of example output of the web translation application 110 during interoperation with the translation manager system 100 for an administrator type user.

Figure 3:
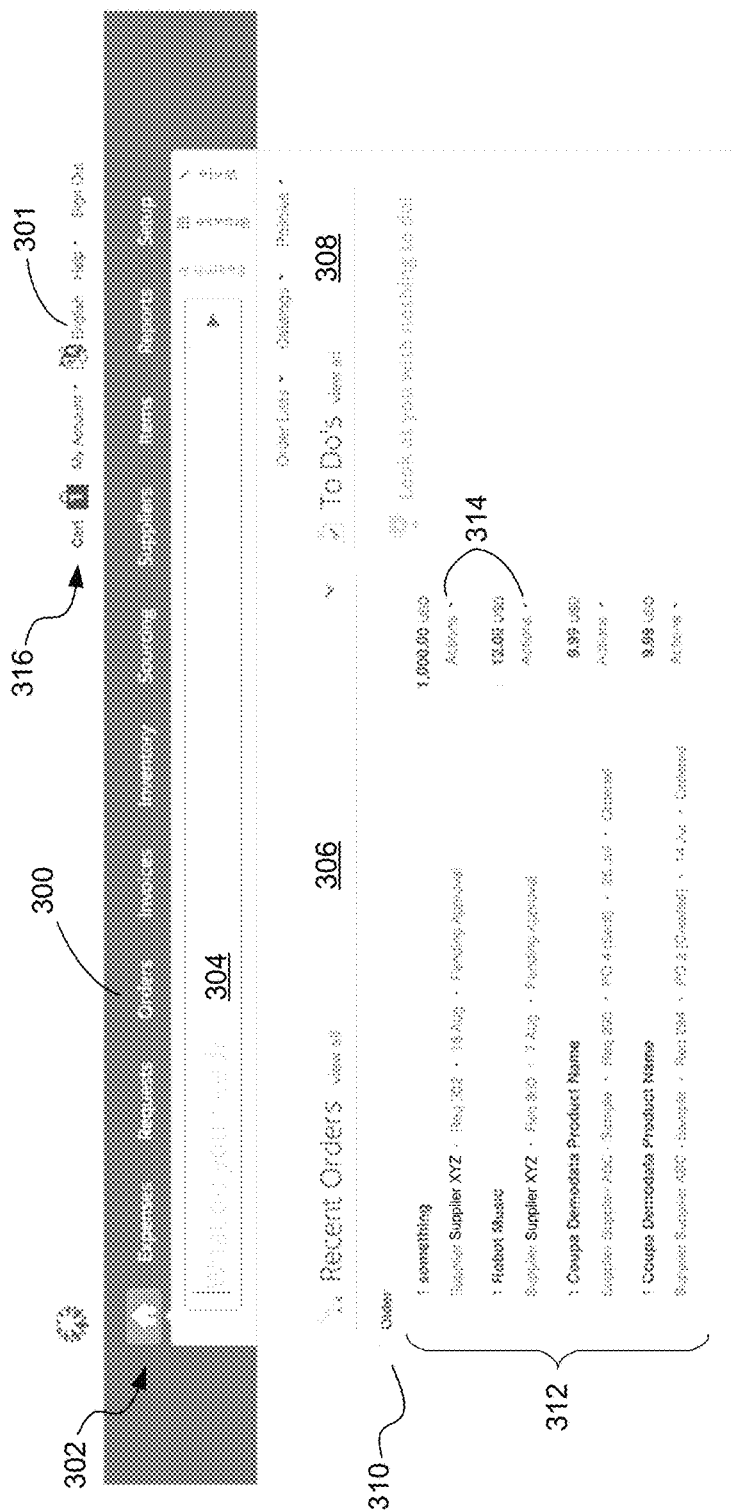
FIG. 3 shows an example of a computer display screen that is generated under control of an embodiment and showing a web page when accessed by a customer type user of the translation manager system.

Referring first to FIG. 3, in an embodiment, the web translation application 110 is programmed to manage enterprise procurement functions such as supply ordering, and generates a web page 300 comprising a function toolbar 302, a search box 304, a recent orders list 306, and a To Do's list 308.

The function toolbar 302 comprises a plurality of hyperlinks which, when selected via input from one of the computing devices 104, 106, 108, causes invoking program code to perform the indicated function or provide a sub menu. The search box 304 is programmed to receive input specifying search terms relevant to functions in the system. The recent orders list 306 comprises one or more section headers 310 that indicate attributes of sets of items that are displayed beneath the header. In the example of FIG. 3, the recent orders list 306 shows output for older orders. A plurality of order lines 312 are output and include an order name, supplier name, requisition number, date and other data relating to an order. Each order further includes an order total amount value and a pull-down menu for performing functional actions as indicated at 314. The To Do's list 308 is empty in this example but may include tasks that need to be performed. The web page 300 further comprises a language selection element 301, which the computing device 104, 106, 108 may select to choose from among different languages available in the translation manager system 100. In the example of FIG. 3, the language that is currently selected is English. The selection of the language may be explicitly provided by the computing device or by a default setting established by an administrator or the computing device in a previous browsing session. Various key-locations of the home screen have text elements that are viewable by the user, but not editable; in the example of FIG. 3, unlike other displays that are described in the following sections, the key-locations are not specifically identified but could include the hyperlinks of toolbar 302, and the text labels that are shown for the recent order list 306 and its content, the To Do's list 308, or others.

Figure 4:
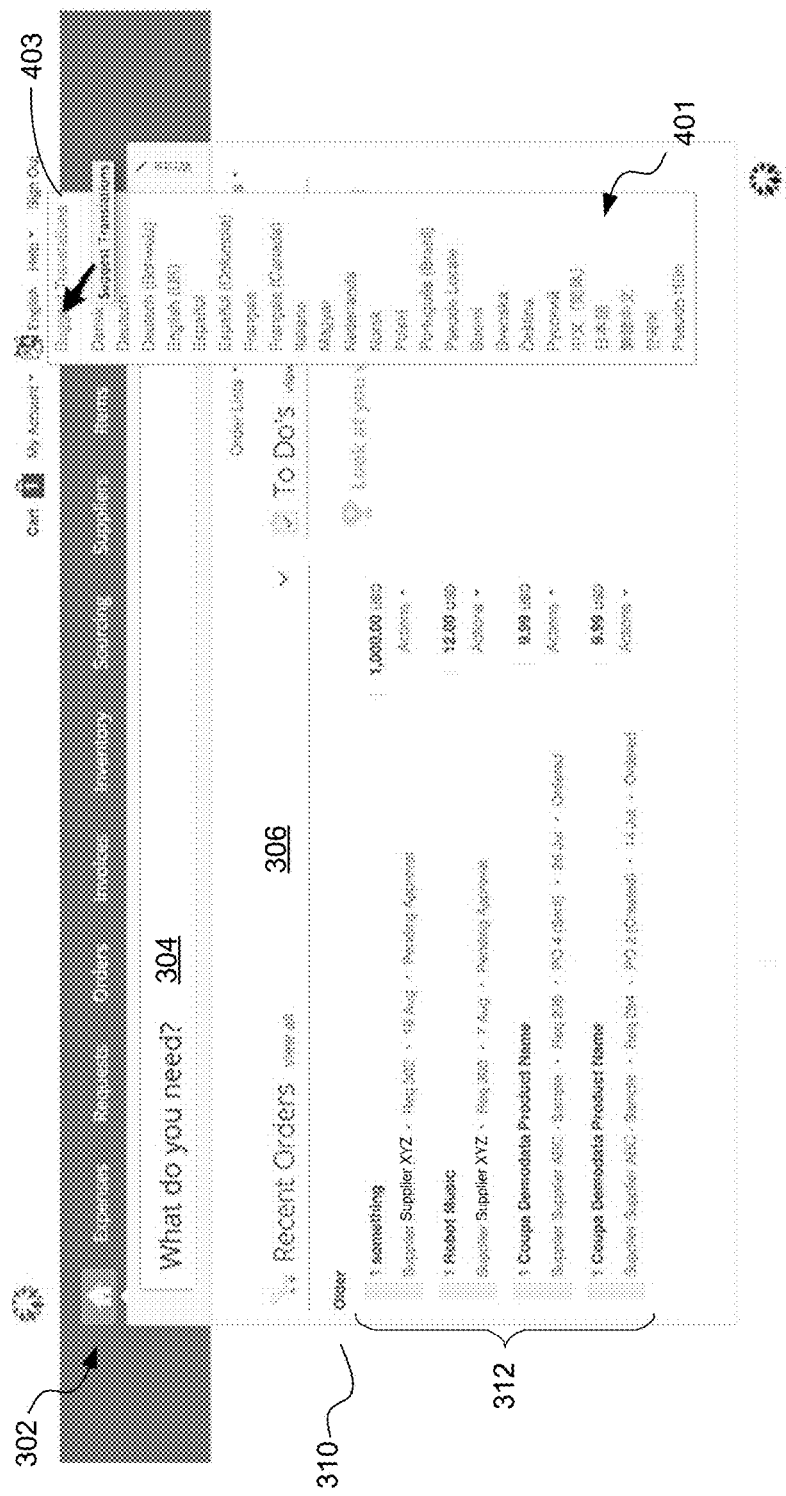
FIG. 4 shows an example of a screen when accessing a suggestion function of the translation manager system.

Referring to FIG. 4, in an embodiment, the web translation application 110 generates a web page 400 comprising the function toolbar 302, the search box 304, the recent orders list 306, and the plurality of order lines 312, where elements numbered starting with 3 correspond to like numbered elements in FIG. 3. In the view of FIG. 4, the language selection element 301 of FIG. 3 has been selected, which causes a drop-down menu 401 to be displayed as seen in FIG. 4. The drop-down menu 401 lists a plurality of natural human-readable languages that are supported by the translation manager system 100 and is programmed to permit selection of one of the languages via user input that selects a particular language by name. For example, some natural languages included in this embodiment of the translation manager system 100 include Danish, German, German (Schweiz, a regional dialect of German spoken in Switzerland), English, Spanish, French, Italian, Polish, Chinese, or many other natural languages.

The natural languages displayed with the drop-down menu 401 may be natural languages selected by an administrator of the translation manager system 100, and the total number of human-readable natural languages may include more languages than what is presently shown in FIG. 3. Languages appearing in drop-down menu 401 may be identified in a configuration data file.

When a natural language is selected using the drop-down menu 401, in an embodiment, the translation manager system 100 is programmed to generate a corresponding web page with the same content as shown on the web page 400, but in the selected natural language, as further described in other sections herein. For example, if the natural language selected is Spanish, then the web translation application 110 is programmed to generate a web page including similar information as already shown in FIG. 4, but in the Spanish language. This process is further illustrated in other sections.

The drop-down menu 401 also includes a "Suggest Translation" link 403. In an embodiment, in response to selecting this link 403, the translation manager system 100 is programmed to enter a translation mode that causes redisplaying a new version of the web page in which selected terms associated with keys are shown in the current natural language that the web page is presented in and highlighted, as next described for FIG. 5. For example, if the link 403 is selected when viewing web page 400, the translation mode would be for the English language.

Figure 5:
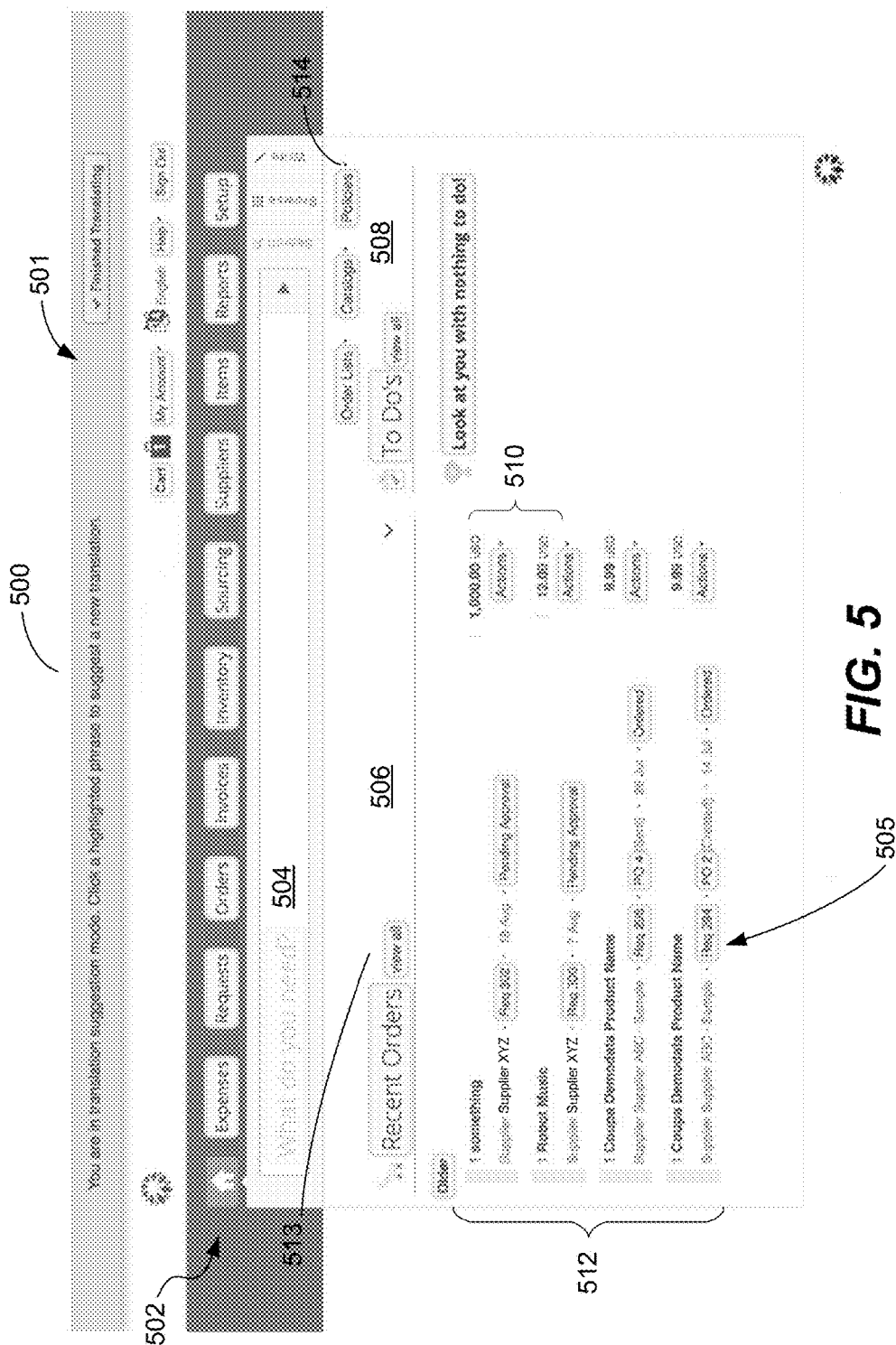
FIG. 5 shows an example of a screen in the suggestion feature of the translation manager system.

Referring to FIG. 5, in an embodiment, the web translation application 110 generates a web page 500 comprising the web page 400 of FIG. 4 in a translation mode of the translation manager system 100. For example, the web page 500 may be generated by the translation manager system 100 after selecting the "Suggest Translation" link 403 from the drop-down menu 401. Since the web page 400 was in the English language, when entering the translation mode, the generated web page 500 is also in the English language.

In an embodiment, web page 500 generated by the web translation application 110 in translation mode comprises an indication 501 that the web page 500 is a web page in the translation mode. For example, the indication 501 may comprise a text message, such as "You are in translation suggestion mode. Click a highlighted phrase to suggest a new translation". Of course, in other embodiments other forms of indications may be used.

In an embodiment, web translation application 110 also is programmed to cause displaying, as part of web page 500 in translation mode, a selectable function toolbar 502, a selectable search box 504, a selectable recent orders list 506, a selectable plurality of order lines 512, and a selectable To Do's list 508. The specific graphical user interface elements that appear in a particular page will vary, and FIG. 5 is merely one example of entering the translation mode for one particular page of the web application. The selectable interface elements are located in the same spatial positions as counterpart elements in FIG. 3, but also include indications that the interface elements are selectable in the translation mode. In an embodiment as shown in FIG. 5, selectable interface elements are shown by including highlighting with the selectable interface element. For example, the selectable function toolbar includes selectable interface elements for "Expenses," "Requests," "Orders," "Invoices," and others. The text of each selectable interface element is highlighted, in one embodiment, by surrounding the text element with a contrasting color from non-selectable interface elements. Yellow is a color that may be used to show highlighting, but other colors may be used.

In an embodiment, the web pages generated by the web translation application 110 may include a mixture of text elements that are editable and some that are not. For example, FIG. 5 shows two order lines 510. Dates "18 Aug" and "7 Aug" are not highlighted as a selectable interface element and thus those elements cannot be associated with suggested translated terms via the translation mode; they are displayed in the same form regardless of language. In contrast, the interface element labeled "Pending Approval" is highlighted as a selectable interface element.

In an embodiment, a selectable interface element includes interactive interface elements. An interactive interface element is an interface element which, when selected at a time when the suggestion mode is not active, will cause additional operations to occur or execute. For example, an interactive interface element may include a "view all" link 513. As another example, an interactive interface element may include a "Policies" drop-down menu 514. In an embodiment, entering the suggestion mode changes the operation of these interactive interface elements, to temporarily allow selection of the interactive interface element as the subject of a suggested translation, but without triggering the underlying operation that otherwise would occur out of the suggestion mode. For example, if the system is not executing in the suggestion mode, then clicking on the "view all" link 513 would cause the system to present all recent orders, which may include those not shown here. However, when the system is executing in the suggestion mode, selecting the "view all" link 513 would present options to provide a suggestion for replacing "view all" with a different translated term.

Figure 6:
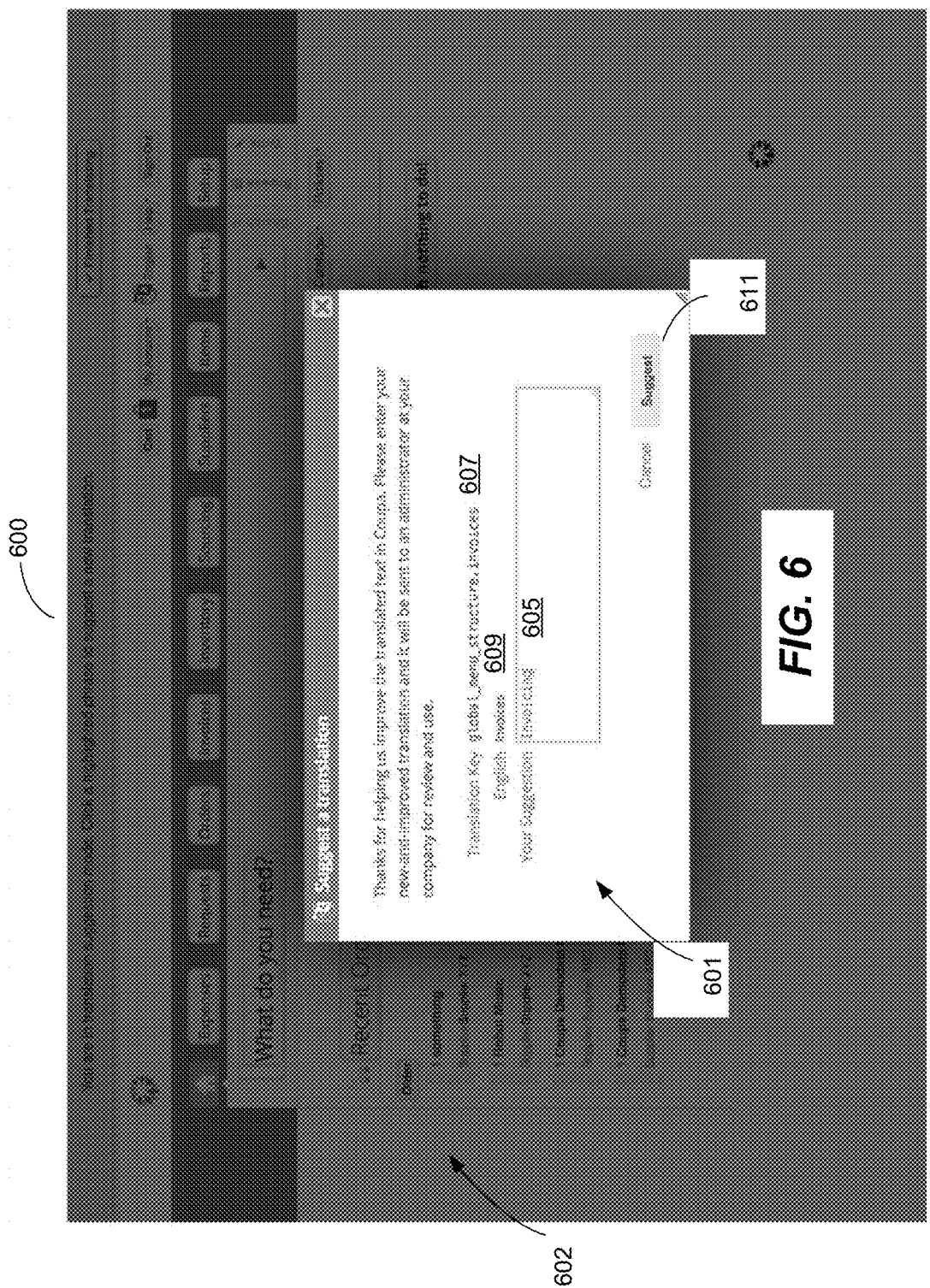
FIG. 6 shows an example of a screen when a key-location is selected in the translation manager system.
Figure 7:
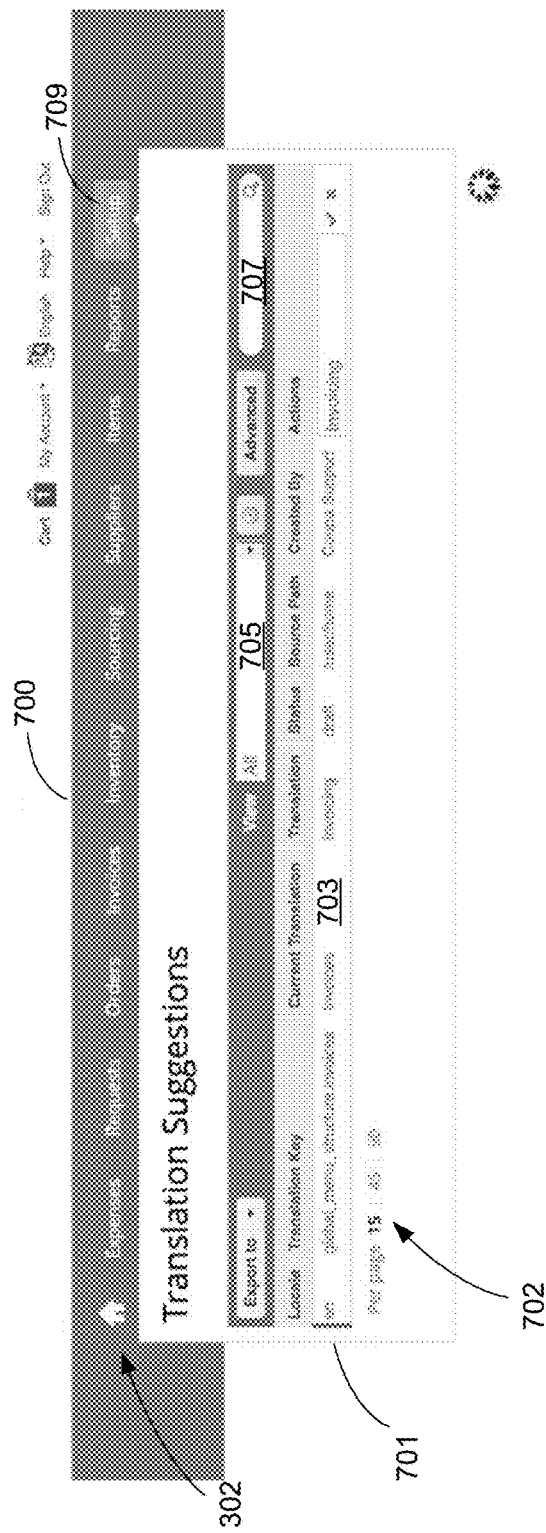
FIG. 7 shows an example of a screen for an administrator type user of the translation manager system.

Referring now to FIG. 6, in an embodiment, in response to selection of a highlighted term in a view such as that of FIG. 5, the web translation application 110 generates a web page 600 comprising a suggestion portion 601 and a background portion 602. The background portion may be out-of-focus or grayed out when compared to the suggestion portion 601. This indicates that the suggestion portion 601 may accept input when selected while the background portion 602 may not accept input when selected.

The specific arrangement seen in FIG. 6 may appear after a user has selected the key-location "Invoices" in the selectable function toolbar 502 of FIG. 5. In FIG. 5, "Invoices" is highlighted, indicating that it is a selectable term capable of receiving a translation suggestion, and selecting "Invoices" then causes the system to display the view of FIG. 6 to receive a suggested translation. The translation manager system 100 generates the suggestion portion 601, based on the selected interface element. The suggestion portion 601 includes a translation key 607 that specifies the internal programmatic name of the key for which a suggested translation will be given. In the example of FIG. 6, the translation key location is "global_menu_structure.invoices." Suggestion portion further comprises a label value 609 that indicates a stored value for the key in a particular language; in the case of FIG. 5, FIG. 6, that language is English. Thus, label value indicates that the translation key 607 "global_menu_structure.invoices" is currently associated with the English term "Invoices" for display in the user interface. The suggestion portion 601 further comprises a text box 605 that is programmed to receive a translation suggestion of the text seen at label 609. In the example of FIG. 6, user input has specified "invoicing" as a substitute term. In an embodiment, selecting a suggest button 611 causes submitting the suggested translated term to the system and, as described in other sections herein, storing the suggested translated term.

In some embodiments, suggested translated terms may be stored in a translation table and then become immediately available for use in generating later displays of the web page for which suggestion mode was used to suggest a translated term. In other embodiments, an approval queue mechanism is used in which translation suggestions from users are queued in a validation queue for review by an authorized individual or administrator and become available for display only after review and approval. In such an embodiment, the queue may be displayed and managed using a separate interface. Referring to FIG. 7, in an embodiment, the web translation application 110 is programmed to generate a web page 700 comprising the function toolbar 302, a queue of suggested translations 701, an export drop-down menu 703, a view drop-down menu 705, and a suggestion search box 707. An administrator type user of the web translation application 110 accesses the web page 700 through selecting a "Setup" function 709 of the function toolbar 302.

The web page 700 includes suggestions, in this embodiment, from customer type users to make changes to web pages that are generated by the web translation application 110. For example, these suggestions may be suggestions stored in a validation queue of the translation manager system 100. In an embodiment, the validation queue may be implemented using a table in a relational database system.

In an embodiment, a queue 701 of suggested translations of FIG. 7 shows a single suggested translation item 703 for an administrator type user to review. The administrator type user may choose to accept or deny the suggestion shown in the queue 701, by choosing check-mark icon or X icon, respectively, as seen at the end of the suggested translation item 703. Although only one suggested translation item is shown in the queue 701 in FIG. 7, in other embodiments there may be any number of suggested translation items in the validation queue and seen in a view such as FIG. 7. Depending on the number of the suggested translation items, the administrator type user may select the links 702 to control how many or few suggestions they would like to view at a given time (e.g., 15, 45, 90 in the example of FIG. 7). Further, in an embodiment, the administrator type user may use the suggestion search box 707 and view drop-down menu to control which suggestions are shown. As an example, the suggestion search box 707 allows the administrator type user to search for suggestions that affect a particular word, such as "Invoices" or other words. Another example would be to filter using the search box only suggestions made by one or more customer type users.

Once the administrator type user has approved a suggestion, the appropriate changes are made to the translation table.

4.1 Introduction of Translated Terms without Restarting Application Server

In an embodiment, the translation manager system 100 may incorporate suggested translated terms into a web application without restarting the web application. For example, an instance of the digital code for the web translation application 110 executes on the application server computer 101. First and second users may register (e.g., log on) with the instance of the web translation application 110. When a suggestion from the first user is received (and accepted, if administrator approval is needed via the validation queue), the suggestion goes live. Moving a suggested translation item to live production, in this context, may comprise updating a translation table that maps key-locations to translated terms on a global or per-instance basis, which the running instance of the web translation application 110 uses to retrieve the correct translated term for a particular key-location each time that a web page is rendered. This means that, when the second user views the web page where the suggestion is made, the change will appear on the second user's computing device because it has been retrieved dynamically and/or in real-time from the translation table as part of rendering the web page for the second user's browser. Thus, by dynamically updating a translation table that is continuously available in memory or in persistent storage to another instance of the web translation application 110, restarting that instance such as by ending and re-executing the digital code of web translation application 110 is not required in order to incorporate the changes made by the first user for other users.

4.2 Validation of Suggestions

Figure 8:
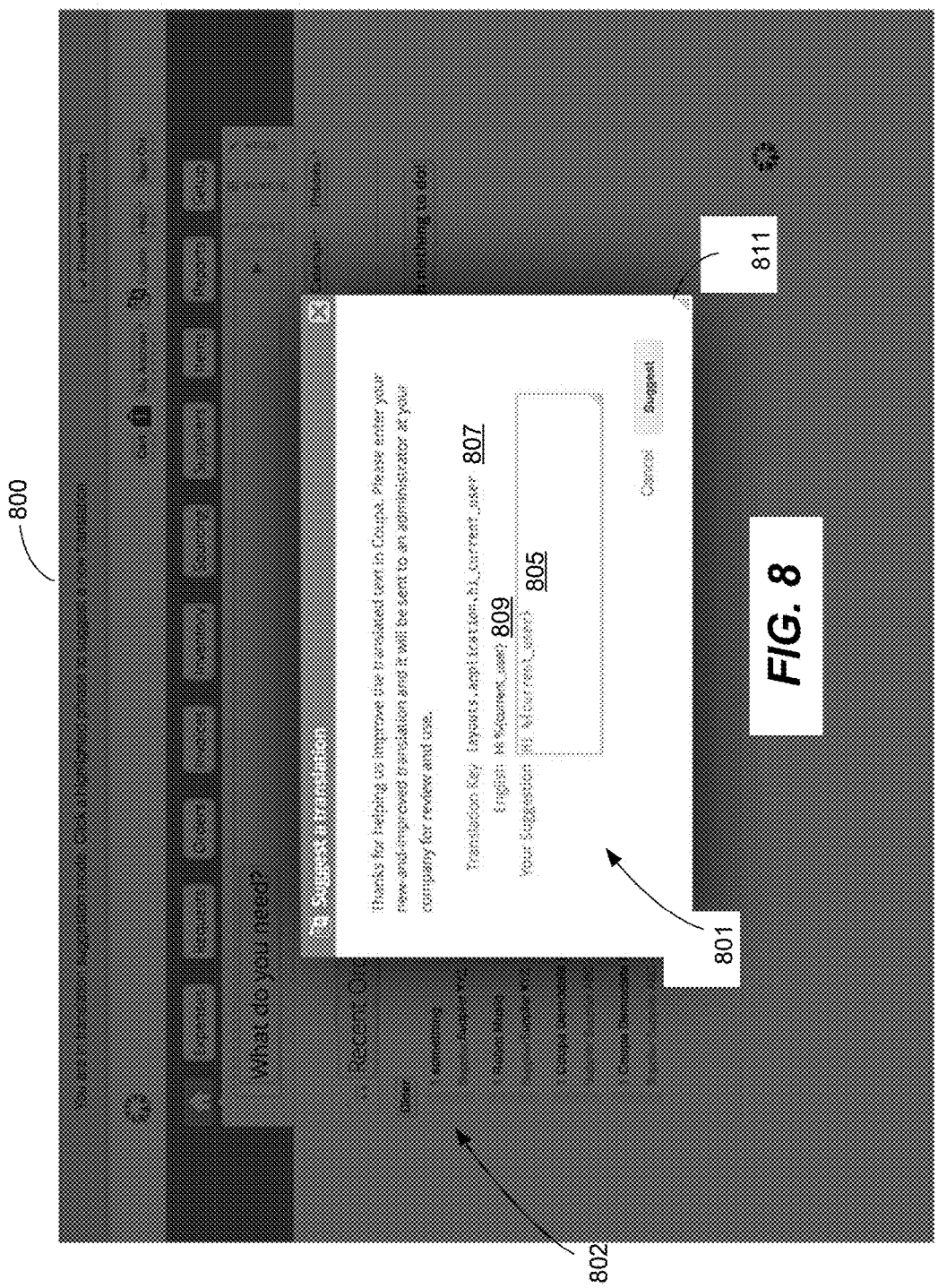
FIG. 8 shows another example of a screen when a key-location is selected in the translation manager system.
Figure 9:
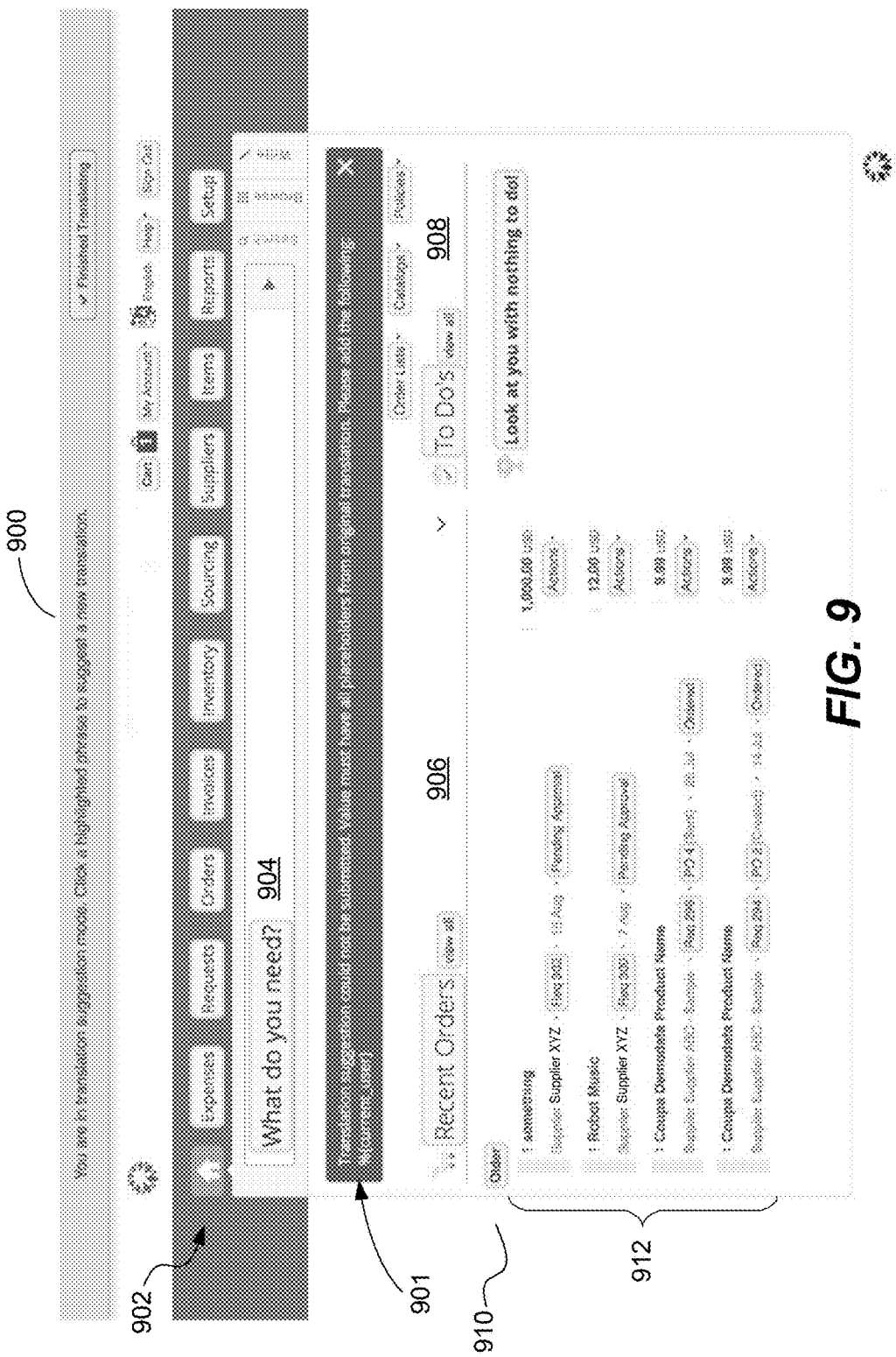
FIG. 9 shows an example of a screen of results after attempting to validate a user's suggestion in the translation manager system.
Figure 10:
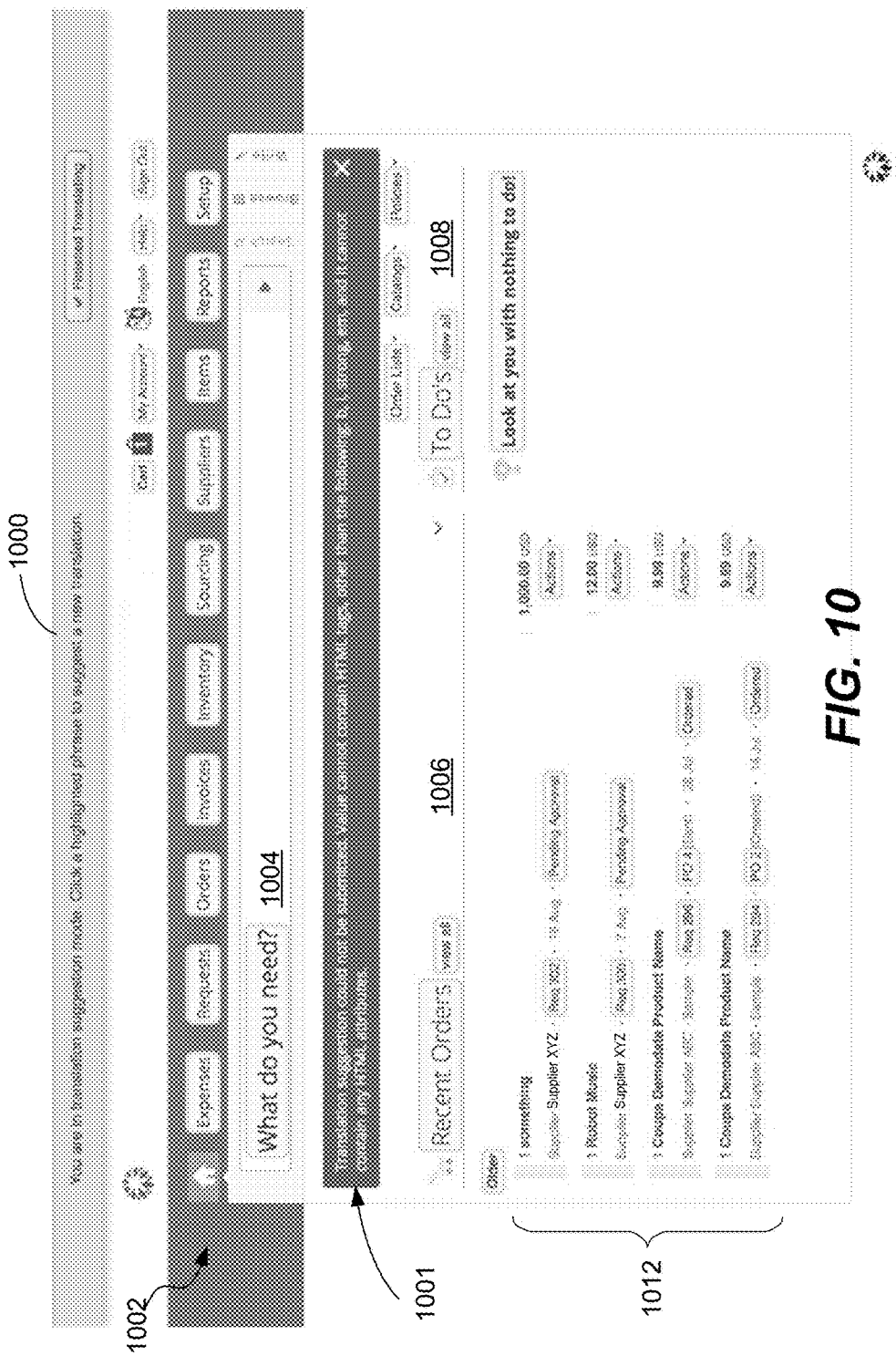
FIG. 10 shows another example of a screen of results after attempting to validate a user's suggestion in the translation manager system.

FIG. 8, FIG. 9, and FIG. 10 show other different screen displays that may be generated under program control for a customer type user that enters a suggestion that is validated by the translation manager system 100, in an embodiment, for various special cases.

Referring first to FIG. 8, in an embodiment, the web translation application 110 generates a web page 800 comprising a suggestion portion 801 and a background portion 802 for use when a key-location includes a substitution variable. The suggestion portion 801 may appear after a selectable interface element is selected. For example, FIG. 8 may appear after a user has selected the key-location with text "Hi %(current_user)." The expression "%{current_user}," in this example, is a substitution variable in which a name of the then-current user is obtained from storage and displayed in concatenation with the literal text "Hi"; only the literal text is subject to a suggested translation. The translation manager system 100 generates the suggestion portion 801, based on the selected interface element. The suggestion portion 801 includes a textbox 805 that is programmed to receive user input for a suggestion of a translation of the literal text in label 809 for key-location 807, as well as an update to the substitution variable. That is, textbox 805 is programmed to receive updated code indicating a different substitution variable or expression, or to delete the substitution variable or expression completely and provide only new or the same literal text. In an embodiment, selecting a suggest button 811 causes the web translation application to store the suggested translated value shown in textbox 805, with or without any substitution variable or expression that has been provided, in the translation table and/or validation queue in the manner previously described for submitting other translation suggestions.

FIG. 9 illustrates an error response that the web translation application 110 is programmed to provide when a new suggested translated term cannot be validated due to erroneous omission of a substitution variable or expression. In an embodiment, the web translation application 110 generates a web page 900 comprising a function toolbar 902, a search box 904, a recent orders list 906, and a plurality of order lines 912. An indication bar 901 shows an example result after attempting to validate a user's suggestion in the translation manager system 100 for a label for a key-location that is marked to require a substitution variable (i.e., %current_user). When a web page is generated using keys that are associated with terms having substitution variables, the then-current text or numeric value of the variable will be substituted for the substitution variable. For example, the symbol '%' instructs the application to insert the then-current stored value for the variable "current_user" when the web page is rendered; "current_user" may designate, for example, a username for a user logged onto the translation manager system 100.

In an embodiment, when a suggested translated term is entered in textbox 805 at the web page 800 without a required substitution variable, then as shown in FIG. 9, the system is programmed to display an error message in an indication bar 901 to specify that the suggestion could not be submitted and that all substitution variables from the selected key-location need to be included with a suggestion. The indication bar 901 also includes the substitution variable required that was missing in the suggestion, for example the expression "%current_user."

In an embodiment, the translation manager system 100 is programmed to inspect received suggested translated terms to test whether the suggested translation may allow potentially harmful script code to be executed on end user computing devices. Referring to FIG. 10, in an embodiment, the web translation application 110 is programmed to generate a web page 1000 comprising a function toolbar 1002, a search box 1004, a recent orders list 1006, a plurality of order lines 1012, and a To Do's list 1008. FIG. 10 represents operation in which the system received a suggested translated term that included potentially executable code, for example in an HTML or JavaScript code format. The screen includes an indication 1001 that the suggestion could not be submitted since the suggestion includes an HTML tag, other than approved HTML tags such as b, i, strong, or em. In an embodiment, testing for script code may include applying a plurality of regular expressions to the suggested translated term or text from the textbox, in which the regular expressions are programmed to match on keywords or key strings based upon the grammar or syntax of HTML, JavaScript, or other code. In response to a match, an error display of the type seen in FIG. 10 may be displayed.

4.3 Machine Learning for Suggestions

In an embodiment, the translation manager system 100 is programmed to implement machine learning of suggested translated terms. As an example, the translation manager system 100 is programmed to determine that an administrator is frequently approving a certain suggestion to replace a particular text element, and in response, to determine that there is a high likelihood that the suggestion is what should replace the particular text element. The predicted suggested translated term then may be presented to the administrator directly or via the validation queue for approval to apply the suggestion everywhere that the particular text element is present. The administrator may apply the suggestion for the particular text element for a number of given users of the translation manager system 100. For example, the suggestion may be applied to all web pages generated for the user, all web pages generated for an organization the user is part of, or for all users of the translation manager system 100.

In an embodiment, the machine learning for suggestions is executed on a separate computing device than computing devices that provides information to generate web pages. For example, the machine learning may occur at a server that aggregators translation suggestions from one or more computing devices. The translation manager system 100 may include one or more separate instances of the translation manager system 100 executing on the one or more computing devices. For example, each instance of the translation manager system 100 may be used by a different organization. The machine learning computing device may aggregate suggestions from the different instances of the translation manager system 100 and generate suggestions based on the aggregated information. An administrator may adjust one or more of the generated suggestions.

In an embodiment, machine language learning for suggestions may occur based on information provided by users of one or more different organizations. For example, if a user of a first organization makes a first suggestion and a user of a second organization makes the first suggestion, the translation manager system 100 may determine, for a user of a third organization, to include the first suggestion. The first suggestion may also include an indication on whether the first suggestion is a suggestion that is user or organization specific. Only if the first suggestion is not user or organization specific, may the first suggestion may be used for others.

4.4 Suggestion Presentation

In an embodiment, the translation manager system 100 is programmed to determine an amount of space that a particular key-location is given on a web page and to determine whether a suggested translated term can be rendered in the available space or, if not, to generate an error indication. In an embodiment, translation manager system 100 comprises stored configuration data specifying the space in pixels or characters that is used by the original translation and adjusts the presentation of a suggested translated term in a different language to accommodate the difference, or generates an error indication. The space at a key-location on a web page may be sufficient to display a text element in one language, but not another language. For example, some languages are more verbose and others are more concise. For example, German phrases tend to be longer than English phrases. On the other hand, Chinese phrases may be shorter than English phrases. In an embodiment, translation manager system 100 stores digital data specifying a size of a bounded box that will be rendered in the web page at a particular key-location, and such data is stored for all key-locations. In an embodiment, translation manager system 100 is programmed to determine that a suggestion is larger or smaller than the size of the bounded box, and in response, to provide output to offer different options to change the term to an acceptable size. Example options including providing a zoom in or out feature, or including a scroll bar that reveals text that did not fit.

5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
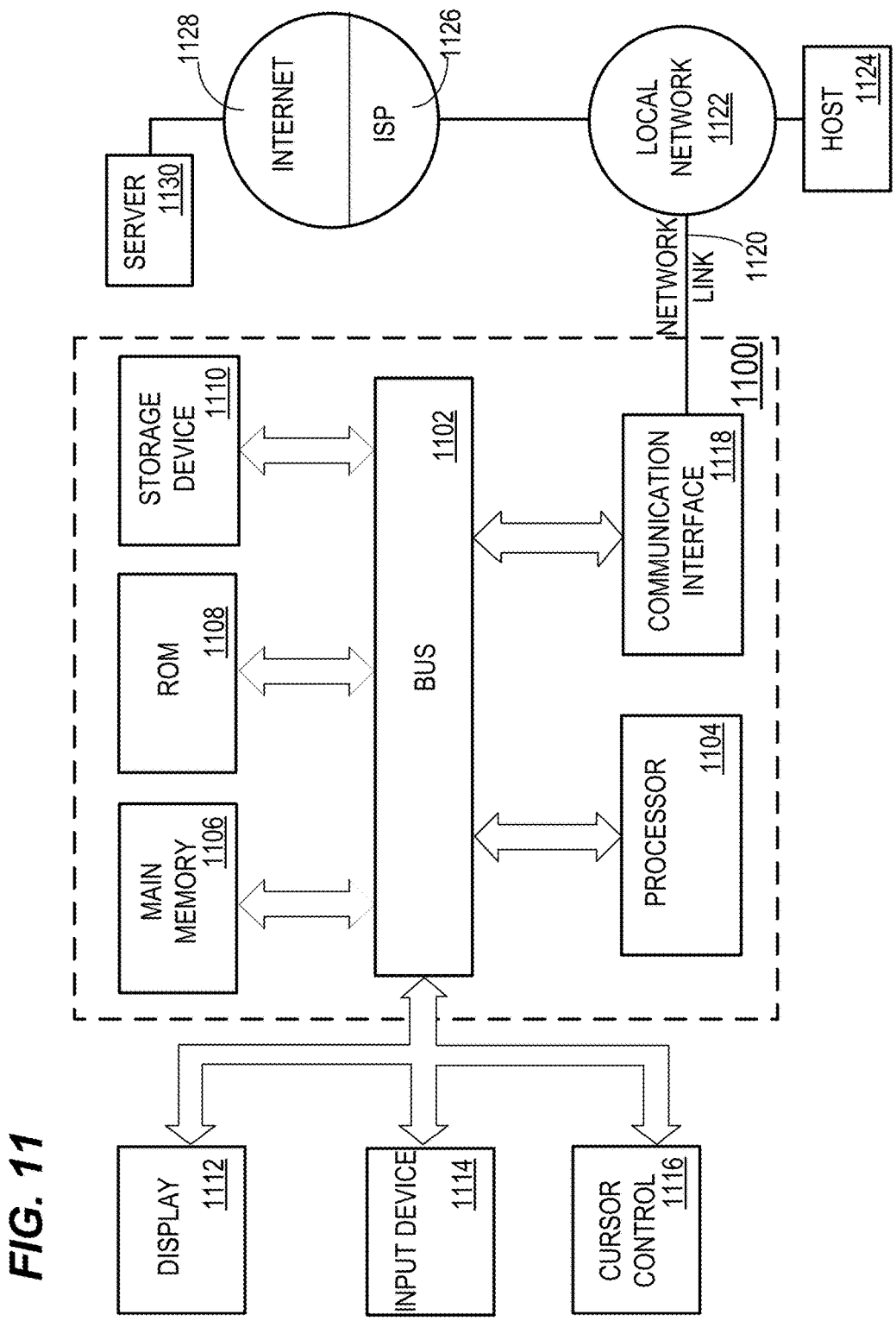
FIG. 11 is a block diagram that illustrates a computer system upon which an embodiment of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the world wide packet data communication network now commonly referred to as the "Internet" 1128. Local network 1122 and Internet 1128 both use electrical, electromagnetic or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   executing, at a server computer, digital program instructions of a web translation application;
   generating a web page of the web translation application by the digital program instructions, including:
      identifying one or more key-locations in the web page of text in a first human-readable language that is capable of translation to a second human readable-language;
      loading, in electronic digital memory of the server computer that is associated with a first instance of the web translation application that is associated with a first client computer, a digital translation table that maps the one or more key-locations to corresponding text elements in the second human readable-language; and
      electing from the digital translation table a particular text element to include in the web page at each of the one or more key-locations;
   transmitting the web page from the server computer to the first client computer;
   receiving, at the server computer, a first input from the first client computer specifying to invoke a suggestion mode;
   receiving a second input from the first client computer specifying an updated text element in the second human readable-language to replace an existing one of the corresponding text elements that is then currently associated with a first key-location stored in the digital translation table;
   storing the second input in a validation queue;
   generating a validation web page for a third client computer, the validation web page including the updated text element of the second input and an identifier for the first key-location;
   receiving, at the server computer, a third input from the third client computer approving the second input;
   removing, by the server computer, the second input from the validation queue;
   updating an entry of the digital translation table for the first key-location to include the updated text element to create an updated digital translation table in the memory of the server computer;
   generating the web page for a second client computer including selecting, from the updated digital translation table, the updated text element for the first key-location in the web page, and
   transmitting the web page from the server computer to the second client computer.

2. The method of claim 1, further comprising, before storing the second input in the validation queue, storing in the validation queue at least one additional input specifying an updated text element in the second human readable-language to replace an existing one of the corresponding text elements stored in the digital translation table.

3. The method of claim 1, further comprising:
   before generating the web page for the first client computer:
      generating another web page of the web translation application by the digital program instructions including identifying another one or more key-locations in the other web page of text in the first human-readable language that is capable of translation to the second human readable-language;
      loading, in electronic digital memory of the server computer that is associated with the first instance of the web translation application that is associated with the first client computer, the digital translation table that maps the one or more key-locations to corresponding text elements in the second human readable-language; and
      selecting from the digital translation table a particular text element to include in the web page at each of the one or more key-locations;
   before transmitting the web page from the server computer to the first client computer, transmitting the other web page from the server computer to the first client computer;
   wherein the web page is accessed by the first client computer through a link included on the other web page.

4. The method of claim 3, further comprising:
   before generating the web page for the second client computer, generating the other web page for the second client computer;
   wherein the web page is accessed by the second client computer through a link included on the other web page.

5. The method of claim 1, further comprising:
   transforming at the server computer the web page to create a translatable web page;

wherein the translatable web page includes for each key-location of the one or more key-locations the text element associated with said key-location and a visual indication that said text element is selectable and editable.

6. The method of claim 5, wherein the translatable web page includes an indication that the translatable web page is editable.

7. The method of claim 1, wherein transmitting the web page to the first client computer includes generating digital code that causes the web page to be presented in a presentation mode;
wherein, while in the presentation mode, the digital code includes for each key of the one or more key-locations the particular text element without instructions to indicate that the said particular text element is editable.

8. The method of claim 1, wherein the first human-readable language is the same human readable-language as the second human readable-language.

9. The method of claim 1, further comprising:
restricting access to the digital translation table when generating web pages for a third client computer associated with a first computer group;
wherein the first client computer, and the second client computer correspond to a second computer group.

10. The method of claim 1, wherein generating the web page for the second client computer further includes registering the second client computer with the first instance of the web translation application.

11. The method of claim 1, wherein selecting from the digital translation table the particular text element includes determining the first client computer is associated with the first human-readable language.

12. The method of claim 1, wherein selecting from the digital translation table the particular text element includes determining the first client computer is not associated with the first human-readable language and selecting the first human-readable language as a default language for the first client computer.

13. A system comprising:
one or more processors;
a non-transitory computer-readable medium having instructions embodied thereon, the instructions, when executed by the one or more processors, cause:
executing, at a server computer, digital program instructions of a web translation application, including:
generating a web page of the web translation application by the digital program instructions including identifying one or more key-locations in the web page of text in a first human-readable language that is capable of translation to a second human readable-language;
loading, in electronic digital memory of the server computer that is associated with a first instance of the web translation application that is associated with a first client computer, a digital translation table that maps the one or more key-locations to corresponding text elements in the second human readable-language; and
selecting from the digital translation table a particular text element to include in the web page at each of the one or more key-locations;
transmitting the web page from the server computer to the first client computer;
receiving, at the server computer, a first input from the first client computer specifying to invoke a suggestion mode;
receiving a second input from the first client computer specifying an updated text element in the second human readable-language to replace an existing one of the corresponding text elements that is then currently associated with a first key-location stored in the digital translation table;
storing the second input in a validation queue;
generating a validation web page for a third client computer, the validation web page including the updated text element of the second input and an identifier for the first key-location;
receiving, at the server computer, a third input from the third client computer approving the second input;
removing, by the server computer, the second input from the validation queue;
updating an entry of the digital translation table for the first key-location to include the updated text element to create an updated digital translation table in the memory of the server computer;
generating the web page for a second client computer including selecting, from the updated digital translation table, the updated text element for the first key-location in the web page, and transmitting the web page from the server computer to the second client computer.

14. The system of claim 13, further comprising, before storing the second input in the validation queue, storing in the validation queue at least one additional input specifying an updated text element in the second human readable-language to replace an existing one of the corresponding text elements stored in the digital translation table.

15. The system of claim 13 wherein the instructions, when executed by the one or more processors, further cause:
before generating the web page for the first client computer:
generating another web page of the web translation application by the digital program instructions including identifying another one or more key-locations in the other web page of text in the first human-readable language that is capable of translation to the second human readable-language; loading, in electronic digital memory of the server computer that is associated with the first instance of the web translation application that is associated with the first client computer, the digital translation table that maps the one or more key-locations to corresponding text elements in the second human readable-language; and selecting from the digital translation table a particular text element to include in the web page at each of the one or more key-locations;
before transmitting the web page from the server computer to the first client computer, transmitting the other web page from the server computer to the first client computer;
wherein the web page is accessed by the first client computer through a link included on the other web page.

16. One or more non-transitory computer-readable media storing instructions, wherein the instructions include:
instructions which, when executed by one or more hardware processors, cause executing, at a server computer, digital program instructions of a web translation application, the executing including:
causing generating a web page of the web translation application by the digital program instructions including identifying a one or more key-locations in the web page of text in a first human-readable language that is capable of translation to a second human readable-language;

loading, in electronic digital memory of the server computer that is associated with a first instance of the web translation application that is associated with a first client computer, a digital translation table that maps the one or more key-locations to corresponding text elements in the second human readable-language; and selecting from the digital translation table a particular text element to include in the web page at each of the one or more key-locations;

instructions which, when executed by one or more hardware processors, cause transmitting the web page from the server computer to the first client computer;

instructions which, when executed by one or more hardware processors, cause receiving, at the server computer, a first input from the first client computer specifying to invoke a suggestion mode;

instructions which, when executed by one or more hardware processors, cause receiving a second input from the first client computer specifying an updated text element in the second human readable-language to replace an existing one of the corresponding text elements that is then currently associated with a first key-location stored in the digital translation table;

instructions which, when executed by one or more hardware processors, cause storing the second input in a validation queue;

instructions which, when executed by one or more hardware processors, cause generating a validation web page for a third client computer, the validation web page including the updated text element of the second input and an identifier for the first key-location;

instructions which, when executed by one or more hardware processors, cause receiving, at the server computer, a third input from the third client computer approving the second input instructions which, when executed by one or more hardware processors, cause removing, by the server computer, the second input from the validation queue;

instructions which, when executed by one or more hardware processors, cause updating an entry of the digital translation table for the first key-location to include the updated text element to create an updated digital translation table in the memory of the server computer;

instructions which, when executed by one or more hardware processors, cause generating the web page for a second client computer including selecting, from the updated digital translation table, the updated text element for the first key-location in the web page, and transmitting the web page from the server computer to the second client computer.

17. The one or more non-transitory computer-readable media storing instructions of claim 16, wherein the instructions further include:

instructions which, when executed by one or more hardware processors, cause transforming at the server computer the web page to create a translatable web page;

wherein the translatable web page includes for each key-location of the one or more key-locations the text element associated with said key-location and a visual indication that said text element is selectable and editable.

18. The one or more non-transitory computer-readable media storing instructions of claim 16, wherein the second input from the first client computer includes at least in part an interpolated term.

* * * * *